3,702,846
PREPARING DIMERS OF 4,4'-AZODIANILINE
Hartwig C. Bach, Pensacola, Fla., assignor to Monsanto Company, St. Louis, Mo.
No Drawing. Continuation-in-part of application Ser. No. 779,243, Nov. 26, 1968. This application Apr. 26, 1971, Ser. No. 137,669
Int. Cl. C09b 43/06
U.S. Cl. 260—169         3 Claims

ABSTRACT OF THE DISCLOSURE 4,4'-azodianiline is selectively dimerized in yields of at least 75% by reacting 4,4'-azo-dianiline with molecular oxygen in the presence of a catalytic amount of a cuprous or cupric salt and a nitrogen base as the reaction medium at temperatures of −10° C. to 50° C.

CROSS-REFERENCE TO RELATED APPLICATION

The present application is a continuation-in-part application of application Ser. No. 779,243 filed Nov. 26, 1968, and now U.S. Pat. No. 3,644,328.

BACKGROUND OF THE INVENTION

Oxidative coupling of organic molecules is known to be a useful tool in the preparation of a variety of organic polymers. For example, Thielheimer in Synthetic Methods of Organic Chemistry, vol. 12, p. 165 (1958) discloses the oxidation of primary aromatic amines to the corresponding azo compounds using oxygen in the presence of a cuprous salt and a nitrogen base. However, the prior art was not concerned with oxidative coupling of diamines. The surprising feature of the oxidative coupling reaction of the present invention is that the dimer product is essentially the only product resulting from the process. The selective oxidation of one amino group of the azodianiline to the exclusion of the other group, which seemingly is equally reactive, is indeed unexpected. Logically, one would expect to produce a series of oligomers and the like of azodianiline but instead it has now been found that yields of 75% and more of the dimer of azodianiline are obtained.

The dimer of 4,4'-azodianiline has been previously prepared by a process described by Ueno and Akiyoshi in the Journal of the American Chemical Society, vol. 76, pages 3667–70 (1954). Such process involves a complex multistep reaction of an aromatic nitroamine with an aromatic nitronitroso compound followed by the reduction to the diamine product. The starting materials of this process are quite expensive and not readily available.

SUMMARY OF THE INVENTION 4,4'-azodianiline is contacted at a temperature between −10° C. and 50° C. with oxygen in the presence of a catalytic amount of a salt of a cupric or cuprous anion in the presence of a nitrogen base to produce with a yield of at least 75% the dimer of azodianiline.

DETAILED DESCRIPTION OF THE INVENTION

As above-indicated the process involves the catalytic dimerization of 4,4'-azodianiline. The process in its simplest form is represented by the following equation:

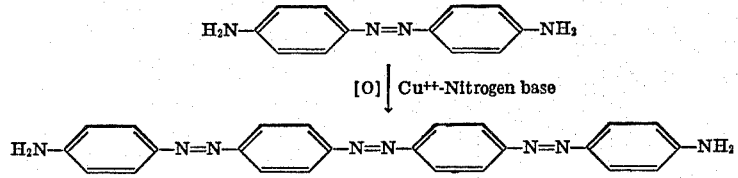

The oxidative dimerization process of this invention involves the oxidative coupling of 4,4'-azodianiline, utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used provided that it forms a complex with the nitrogen base that is soluble in the reaction medium and that it is capable of existing in the cupric state. The particular salt used has no substantial effect on the type of product obtained. Typical examples of cuprous salts suitable for the process are cuprous chloride; cuprous bromide, cuprous sulfate, cuprous acetate, cuprous benzoate and the like. The use of cupric salts is generally less desirable in the catalyst preparation although cupric acetate is quite effective.

It is believed that cupric ion complexed with a nitrogen base, complexes with the amino groups of azodianiline, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize cuprous to cupric.

Since the reaction does not destroy the catalyst, only a small catalytic amount of cuprous or cupric salt needs to be used, from about 0.1 to 10 moles percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the primary diamine starting material in order to help the reaction proceed at the most optimum rate and give better yields.

Suitable nitrogen bases include various amides such as phosphoramides, carboamides and sulfonamides. Examples of such amides are hexamethylphosphoramide, dimethylacetamide, dimethylformamide, dimethylpropionamide, diethylacetamide, N-acetyl-pyrrolidone, N-ethyl pyrrolidone and the like. Of these amide bases, dimethylacetamide and hexamethylphosphoramide are generally preferred.

Other nitrogen bases, suitable for carrying out the process of this invention, include aliphatic tertiary amines such as triethylamine, tributylamine, diethylmethylamine, and cyclic amines such as pyridine, n-alkyl piperidines, quinolines, isoquinolines, N-alkyl morpholines, and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent by it may also be used as the reaction medium. It has been found that reaction media in which the products of the reaction are relatively insoluble lead to a cleaner, simpler separation of product from catalyst and by-products, thus increasing the yield of diamine obtained.

In a preferred mode of operation of the process of the invention, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

In the practice of this invention, the order of addition of the various reactants is not critical. In one preferred mode of carrying out this invention, the catalyst may be prepared by oxidizing cuprous chloride in a base such as pyridine. The azodianiline is then added and oxidatively coupled by the addition of oxygen until about the theoretical volume has been consumed.

Alternatively, the catalyst may be prepared in the same manner as described above and then added to a chilled solution of azodianiline in the appropriate reaction medium, prior to the addition of oxygen. In either case, the amount of oxygen consumed can be measured with great accuracy, by using a closed system and a gas burette.

The preparation of the catalyst and the oxidative coupling reaction may be carried out in the temperature range of from about −10° C. to about 50° C. The rate of reaction is unsuitably slow below −10° C. Above 50° C. an undesirable amount of unwanted products are made.

Example

This illustrates the preparation of

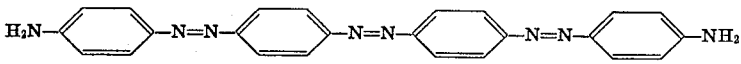

Cuprous chloride (10 g.) was oxidized with molecular oxygen in a mixture of 720 ml. of N,N′-dimethylacetamide (DMAc) and 180 ml. of pyridine, 4,4′-azodianiline (20 g.) was added to this catalyst solution and the resulting reaction mixture dissolved and was stirred under an atmosphere of $O_2$; 1185 ml. of $O_2$ were absorbed in 4 hrs. 40 min. at 24° C. The reaction product was isolated by coagulation of the reaction mixture in 1 l. of ammonium hydroxide. After dilution with 4.4 l. of $H_2O$ the product was filtered off, dried and extracted into 190 ml. of dimethylformamide. By coagulation in $H_2O$ 16.1 g. (80.1% yield) of the title compound were obtained, M.P.=290–291° C. (recryst. from pyridine).

I claim:

1. A process for the selective formation of the dimer of 4,4′-azodianiline comprising reacting at −10° C. to 50° C. 4,4′-azodianiline with molecular oxygen in the presence of a catalytic amount of a copper compound selected from the group consisting of cuprous chloride, cuprous bromide, cuprous sulfate, cuprous acetate, cuprous benzoate and cupric acetate and a nitrogen base as the reaction medium selected from the group consisting of pyridine, hexamethylphosphoramide, dimethylacetamide, dimethylformamide, dimethylpropionamide, diethylacetamide, N-acetyl-pyrrolidone, N-ethyl-pyrrolidone, triethylamine tributylamine, diethylmethylamine, quinoline and isoquinoline to produce in yields of at least 75% of the corresponding dimer of 4,4′-azodianiline represented by the following equation:

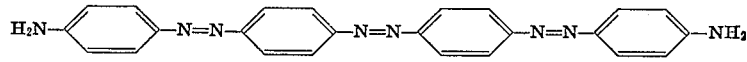

2. The process of claim 1 wherein the nitrogen base is pyridine.

3. The process of claim 2 wherein the copper compound is cuprous chloride.

References Cited

Bach: Chemical Abstracts, vol. 66, p. 9857 (1967).

Terent'ev et al.: Chemical Abstracts, vol. 50, p. 4807 (1956).

Theilheimer: "Synthetische Methoden der Organischen Chemie," vol. 3, p. 249 (1949).

Theilheimer: "Synthetische Methoden der Organischen Chemie," vol. 12, p. 360 (1958).

Theilheimer: "Synthetische Methoden der Organischen Chemie," vol. 20, p. 211 (1966).

FLOYD D. HIGEL, Primary Examiner

U.S. Cl. X.R.

260—144, 166